US009832527B2

(12) United States Patent
Skowronski et al.

(10) Patent No.: US 9,832,527 B2
(45) Date of Patent: *Nov. 28, 2017

(54) SYSTEM AND A METHOD FOR DISTRIBUTING CONTENT VIA STATIC CHANNEL ASSIGNMENT IN A MOBILE CONTENT GATEWAY

(71) Applicant: ADVANCED DIGITAL BROADCAST S.A., Chambesy (CH)

(72) Inventors: Zbigniew Skowronski, Zielona Gora (PL); Przemyslaw Sergiel, Zielona Gora (PL)

(73) Assignee: ADVANCED DIGITAL BROADCAST S.A., Chambesy (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,633

(22) Filed: May 2, 2016

(65) Prior Publication Data

US 2016/0323634 A1 Nov. 3, 2016

(30) Foreign Application Priority Data

Apr. 30, 2015 (EP) .................................... 15165828

(51) Int. Cl.
*H04N 7/16* (2011.01)
*H04N 21/443* (2011.01)
(Continued)

(52) U.S. Cl.
CPC ..... *H04N 21/4436* (2013.01); *H04N 21/2665* (2013.01); *H04N 21/41407* (2013.01);
(Continued)

(58) Field of Classification Search
CPC ......... H04N 21/4126; H04N 21/43615; H04N 21/436; H04N 21/2223; H04N 21/2143
See application file for complete search history.

(56) References Cited

U.S. PATENT DOCUMENTS

| 5,768,280 A * | 6/1998 | Way ........................ H04J 1/12 340/9.1 |
| 6,202,211 B1 * | 3/2001 | Williams, Jr. .... H04L 29/06027 348/E7.05 |

(Continued)

FOREIGN PATENT DOCUMENTS

| EP | 1355496 A2 | 10/2003 |
| EP | 2720470 A2 | 4/2014 |

(Continued)

*Primary Examiner* — Pankaj Kumar
*Assistant Examiner* — Timothy Newlin
(74) *Attorney, Agent, or Firm* — Mark M. Friedman

(57) ABSTRACT

A method for distributing video content to at least one mobile device (411-413) at a customer premises (140) system comprising a plurality of stationary devices (421-423) capable of receiving the video content from at least one content provider (160). The method comprises the steps of: receiving, at the stationary devices (421-423), requests to tune a tuner (512, 513) of the stationary device (421-423) to a requested channel received from the content provider (160); outputting the content, of the channel tuned to by at least one stationary device (421-423), to a mobile content gateway (414) at the customer premises (140) system; handling, at the mobile content gateway (414), a list of video channels (611) comprising data associating each channel of the list with a stationary device (421-423); sending, from the mobile content gateway (414), to the at least one stationary device (421-423) requests to tune to channels assigned according to the list of video channels (611); preparing at least one single-program stream from the content received from the at least one stationary device (421-423); outputting, from the mobile content gateway (414), the at least one single-program stream as at least one adaptive stream; and providing the at least one adaptive stream to the at least one mobile device (411-413) over a wireless data transmission interface.

7 Claims, 16 Drawing Sheets

(51) Int. Cl.
  *H04N 21/414* (2011.01)
  *H04N 21/462* (2011.01)
  *H04N 21/426* (2011.01)
  *H04N 21/438* (2011.01)
  *H04N 21/2665* (2011.01)
  *H04N 21/4227* (2011.01)
  *H04N 21/4402* (2011.01)
  *H04N 21/63* (2011.01)
  *H04N 21/643* (2011.01)

(52) U.S. Cl.
  CPC ..... *H04N 21/4227* (2013.01); *H04N 21/4263* (2013.01); *H04N 21/4383* (2013.01); *H04N 21/440218* (2013.01); *H04N 21/4622* (2013.01); *H04N 21/632* (2013.01); *H04N 21/64322* (2013.01)

(56) References Cited

U.S. PATENT DOCUMENTS

| | | | |
|---|---|---|---|
| 6,628,301 B1* | 9/2003 | Acton | H04N 5/50 348/731 |
| 6,678,737 B1* | 1/2004 | Bucher | H04L 12/2836 709/231 |
| 9,232,174 B1* | 1/2016 | Kotab | H04N 21/4126 |
| 2003/0128302 A1* | 7/2003 | Potrebic | H04N 5/50 348/731 |
| 2003/0192055 A1* | 10/2003 | Aoki | H04N 7/17318 725/109 |
| 2004/0098746 A1* | 5/2004 | Lee | H04N 7/106 725/80 |
| 2004/0203338 A1 | 10/2004 | Zilliacus | |
| 2005/0044570 A1 | 2/2005 | Poslinski | |
| 2005/0063418 A1* | 3/2005 | Case | H04N 21/4263 370/466 |
| 2005/0111819 A1 | 5/2005 | Cormack | |
| 2006/0195873 A1* | 8/2006 | Gopalan | H04N 5/50 725/100 |
| 2007/0130604 A1* | 6/2007 | Han | H04N 21/4263 725/131 |
| 2008/0222689 A1 | 9/2008 | Howcroft | |
| 2008/0263621 A1 | 10/2008 | Austerliz | |
| 2009/0158341 A1 | 6/2009 | Miller | |
| 2009/0158370 A1* | 6/2009 | Li | H04N 7/17318 725/110 |
| 2009/0199242 A1 | 8/2009 | Johnson | |
| 2009/0210912 A1 | 8/2009 | Cholas | |
| 2010/0083326 A1 | 4/2010 | Kisel | |
| 2010/0154021 A1* | 6/2010 | Howarter | H04N 21/4126 725/141 |
| 2010/0188575 A1* | 7/2010 | Salomons | H04N 5/50 348/553 |
| 2011/0013091 A1* | 1/2011 | Kim | H04N 7/163 348/731 |
| 2011/0032856 A1* | 2/2011 | Ozawa | H04L 12/6418 370/310 |
| 2011/0035466 A1 | 2/2011 | Panigrahi | |
| 2011/0047394 A1 | 2/2011 | Sato | |
| 2011/0119719 A1* | 5/2011 | Morzos | H04N 21/43615 725/85 |
| 2011/0252451 A1 | 10/2011 | Turgeman | |
| 2011/0302320 A1 | 12/2011 | Dunstan | |
| 2011/0302606 A1 | 12/2011 | Berrett | |
| 2012/0054809 A1* | 3/2012 | Chowdhury | H04N 21/2223 725/93 |
| 2012/0096492 A1* | 4/2012 | Urban | H04W 16/14 725/39 |
| 2013/0198779 A1* | 8/2013 | Moon | H04N 5/50 725/39 |
| 2013/0305292 A1* | 11/2013 | Chen | H04N 21/472 725/54 |
| 2014/0157325 A1* | 6/2014 | Jabara | H04N 21/64322 725/59 |
| 2014/0189066 A1 | 7/2014 | Gholmieh et al. | |
| 2014/0229563 A1 | 8/2014 | Kang | |
| 2014/0282756 A1* | 9/2014 | Reichgott | H04N 21/47217 725/88 |
| 2015/0052568 A1* | 2/2015 | Glennon | H04N 21/482 725/100 |
| 2015/0070585 A1 | 3/2015 | Sharif-Ahmad et al. | |
| 2015/0089536 A1 | 3/2015 | Byerley | |
| 2015/0146597 A1 | 5/2015 | Jeong et al. | |
| 2015/0156270 A1* | 6/2015 | Teraoka | G06F 13/00 709/219 |
| 2016/0134794 A1 | 5/2016 | Grabau | |
| 2016/0182966 A1 | 6/2016 | Hao | |

FOREIGN PATENT DOCUMENTS

| | | |
|---|---|---|
| WO | 2011/035443 A1 | 3/2011 |
| WO | 2012/066558 A1 | 5/2012 |
| WO | 2012097006 | 7/2012 |

\* cited by examiner 121.1, 123.1, 181.1 — Monitoring and Management
121.2, 123.2 — Metadata
181.2 — Video Content (e.g. MPTS or SPTS over IP, Cable)

431.1, 432.1, 433.1 – Gateway Monitoring and Management
431.2, 432.2, 433.2 – Gateway Video Content

[54] SYSTEM AND A METHOD FOR
DISTRIBUTING CONTENT VIA STATIC
CHANNEL ASSIGNMENT IN A MOBILE
CONTENT GATEWAY

TECHNICAL FIELD

The present invention is related to transmission of video data, in particular to transmission of video data within a B2B video services system, wherein channels are to be assigned, to mobile clients, for transmission of content.

BACKGROUND

Market trends in television, B2B video service sector show more and more interest in allowing offering video services to mobile devices. For example, a hotel operator (or any other facility for end users, such as a healthcare facility) may wish to offer users a service of watching video content not only on stationary TV sets of the hotel, but on the users' own mobile devices (such as laptops, tablets or smartphones) as well.

Up to now, video was mostly delivered to customers' premises from a video provider via a regular RF infrastructure (Cable, Terrestrial, Satellite) and a stationary devices (such as set top boxes (STB) or set back boxes (SBB)) at the customer premise were used to decrypt, decode and deliver content directly (for example via a HDMI cable) to TV sets for watching by the end users.

Video delivery of B2B services to mobile devices requires a use of another technology: IP-based and supporting adaptive streaming. To do that in the existing systems, as described before, upgrade of existing operator's network would be needed, for example by installing sophisticated headends to transmit the video content. The B2B sector is smaller than the residential sector, therefore a significant investment to upgrade technology can be problematic to implement.

Delivering video services to mobile devices exhibits challenges related to upgrading the current delivery networks to offer IP unicast transmission and adding capability to broadcast adaptive type streaming (such as HLS, Dash or MS Smooth Streaming), which helps to run smooth services without interruption in open Internet networks, where there is not much control regarding network throughput and capacity.

Delivering video content as a unicast transmission generates a lot of network traffic. Every end-user receives a dedicated stream of data (separate streams are transmitted even to end users watching the same video Running a unicast transmission on existing networks may overload or result in unacceptably low network bandwidth per user.

In order to prepare the network for unicast transmission for mobile devices, significant upgrade is often necessary, which can be expensive and time-consuming. Apart of upgrading the network to unicast transmission, investment on operator's site is needed to build a content delivery network (CDN) capable to serve adaptive streaming. That also requires a significant cost and time investment.

There is therefore a need to provide a way to offer B2B video services to mobile devices which would not require substantial investment in new system elements and would utilize the resources of the existing systems.

SUMMARY

There is disclosed a method for distributing video content to at least one mobile device at a customer premises system comprising a plurality of stationary devices capable of receiving the video content from at least one content provider. The method comprises the steps of: receiving, at the stationary devices, requests to tune a tuner of the stationary device to a requested channel received from the content provider; outputting the content, of the channel tuned to by at least one stationary device, to a mobile content gateway at the customer premises system; handling, at the mobile content gateway, a list of video channels comprising data associating each channel of the list with a stationary device; sending, from the mobile content gateway, to the at least one stationary device requests to tune to channels assigned according to the list of video channels; preparing at least one single-program stream from the content received from the at least one stationary device; outputting, from the mobile content gateway, the at least one single-program stream as at least one adaptive stream; and providing the at least one adaptive stream to the at least one mobile device over a wireless data transmission interface.

The method may further comprise sending, from the mobile content gateway, to the at least one stationary device a request to tune to a channel requested by the at least one mobile device and not being comprised in the list of video channels.

The method may further comprise, after receiving at the stationary device a power-off command while a tuner tuned to a channel requested by the mobile content gateway is still active, disabling a local tuner and outputs of an A/V block of the stationary device while continuing to operate the tuner tuned to a channel requested by the mobile content gateway.

The method may further comprise, at the mobile device, receiving a content list from a manager module and allowing the user to select a channel from the content list.

The method may further comprise checking, at the mobile device, checking whether an adaptive stream for the selected channel is available from the mobile content gateway and if not, sending a request for an adaptive for the selected channel to the content provider.

There is also disclosed a computer program comprising program code means for performing all the steps of the method as described above when said program is run on a computer, as well as a computer readable medium storing computer-executable instructions performing all the steps of the method as described above when executed on a computer.

There is also disclosed a system for distributing video channels to at least one mobile device at a customer premises system comprising a plurality of stationary devices capable of receiving the video channels from at least one content provider. The system comprises: a plurality of tuner control units at the stationary devices, configured to receive requests to tune a tuner of the stationary device to a requested channel received from the content provider and to output the content of the channel tuned to by at least one stationary device to a mobile content gateway at the customer premises system. The mobile content gateway comprises: a mobile content gateway manager configured to manage a list of video channels comprising data associating each channel of the list with a stationary device and to send to the tuner control unit of the at least one stationary device requests to tune to channels assigned according to the list; a video processing unit configured to prepare at least one single-program stream from the content received from the at least one stationary device; and a player unit configured to output the at least one single-program stream as at least one adaptive stream. The system further comprises a wireless access point configured to provide the at least one adaptive stream to the at least one mobile device over a wireless data transmission interface.

The mobile content gateway may further comprise a storage configured to store the video streams received from the stationary devices and the single-program streams to be transmitted to the at least one mobile device.

BRIEF DESCRIPTION OF FIGURES

The invention is shown by means of example embodiments on a drawing, in which.

NOTATION AND NOMENCLATURE

Figure 1A:
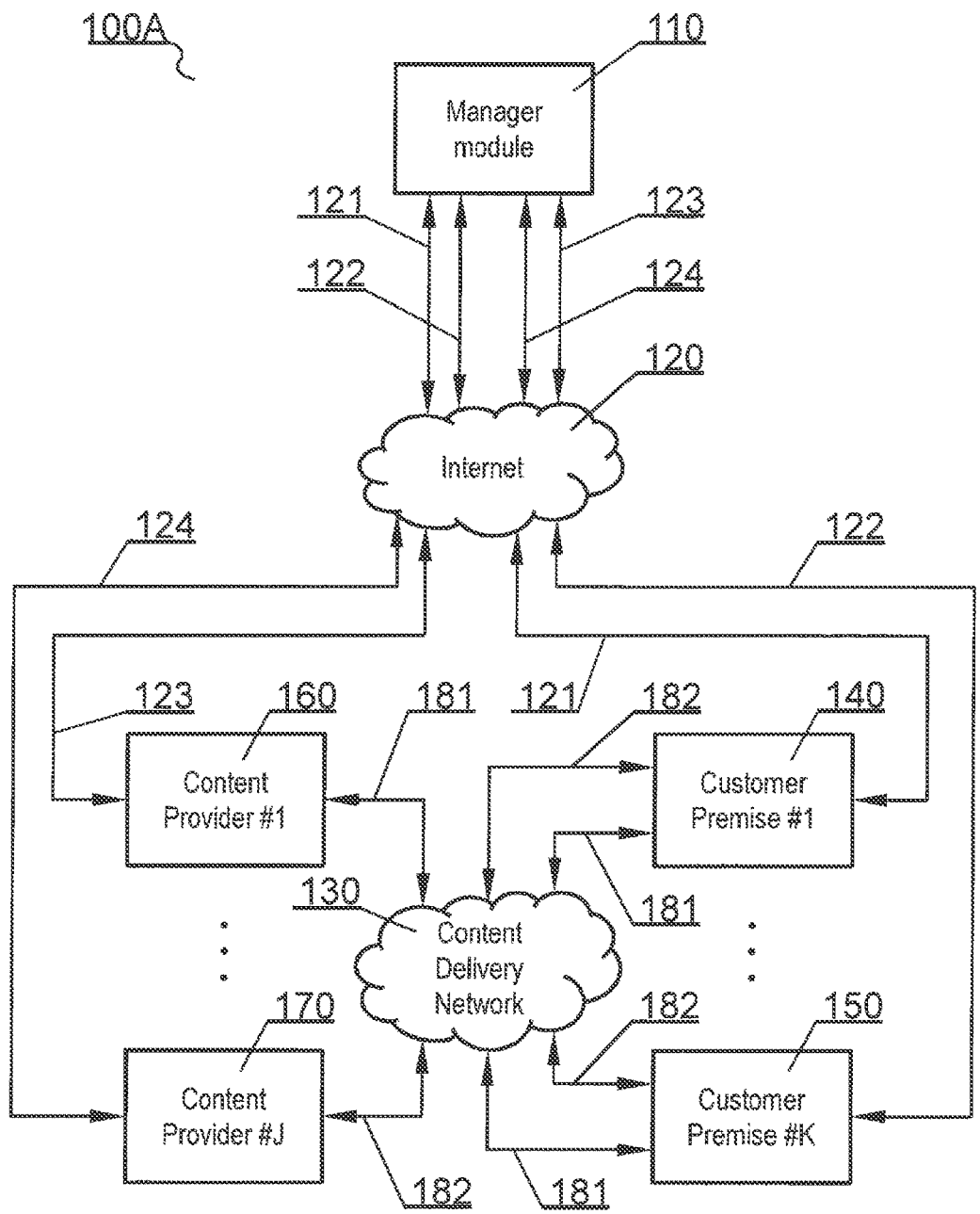
FIGS. 1A-1D show various embodiments of a system according to the invention.

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

In the present disclosure, the term "video content" is to be understood more broadly as multimedia content comprising video data and associated audio data and associated additional data (such as content description, etc.). The term "video content" is used to distinguish the content from other content types, such as still images or raw data (e.g. files).

DETAILED DESCRIPTION

The system and method presented herein allows utilizing the existing infrastructure of the B2B sector to build local mobile content gateways (MCGs), which help to overcome challenge of network upgrade to IP unicast transmission and adaptive streaming. An example of such infrastructure can be a Commercial Video Solution offered by Advanced Digital Broadcast. Stationary devices (such as set-top boxes or set-back boxes), which are part of the existing customer premise infrastructure often have spare resources (i.e. broadcast tuners), which can be used as interfaces to receive content delivery in a traditional manner (such as QAM, Satellite, Terrestrial, IP multicast).

Each set-top box can be tuned to pre-assigned channels. Data received by particular set-top boxes can be delivered to a gateway control and processing unit (as described below), which generates adaptive streaming and applies local content security to protect the content.

The number of stationary devices, deployed in an average customer premise facility, is typically about 100 units, which allows building a farm of ingestion units to provide an efficient B2B video service offer to about 100 mobile devices or more, in case when there are more than 1 free tuner available at each stationary device.

The control of pre-assignment is possible through a control unit (as described below in details). The control unit can be accessed remotely or locally. Data received by particular stationary devices is delivered (for example as an IP stream of single-program stream data) to a gateway control and processing unit, which processes it to adaptive streaming (for example transcodes to various bit rates, packages into small chunks and generates an applicable manifest metadata file as it is needed by the adaptive streaming).

A mobile content gateway unit (as described in details below) can apply local content security to protect the delivered content. Content prepared in this way is transmitted over a wireless network (such as Wi-Fi) to mobile devices within the customer premise facility (such as a hotel). The processed content is ready for use by the end user mobile devices in a given B2B location (also called a customer premise).

Information about a list of available video assets (local channels) can be delivered to mobile devices via a client application (as described in details below) in a seamless manner. Management of content list and delivery method can be controlled by the existing manager module (as described in details below).

FIGS. 1A-1D show various embodiments of a system according to the invention, depending on the number of content providers and the number of content recipients at a customer premise (such as a hotel or a hospital).

The system 100A, shown in FIG. 1A, is designed to provide video content from a plurality of content providers 160, 170 to a plurality of customer premises 140, 150 over one or more content delivery networks 130 (for example a QAM, Satellite, Terrestrial or IP multicast network) via communication channels 181, 182.

A manager module 110 is configured to monitor the devices at the customer premises 140, 150, and in particular to receive content requests from the devices, receive content metadata from content providers 160, 170 and transmit the content metadata to the user devices (mobile or stationary) at the customer premises 140, 150.

The manager 110 communicates with the devices at the customer premises 140, 150 via communication channels 121, 122 and with the content providers 160, 170 via communication channels 123, 124, wherein the communication channels 121-124 are preferably implemented over an open network, such as Internet.

Figure 1B:
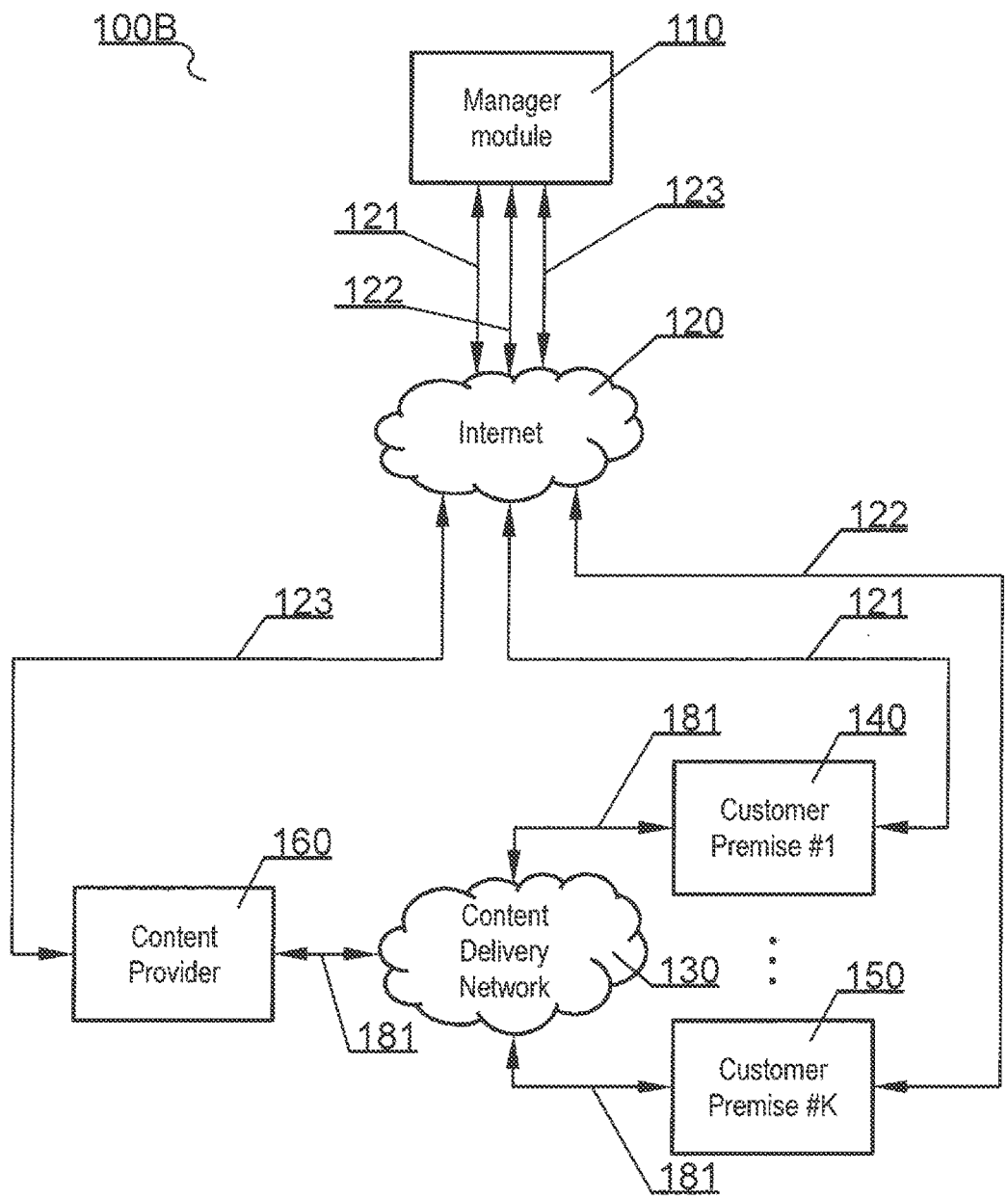

The system 100B shown in FIG. 1B is similar to that shown in FIG. 1A, with the difference in that the content is delivered to a plurality of customer premises 140, 150 from a single content provider 160.

Figure 1C:
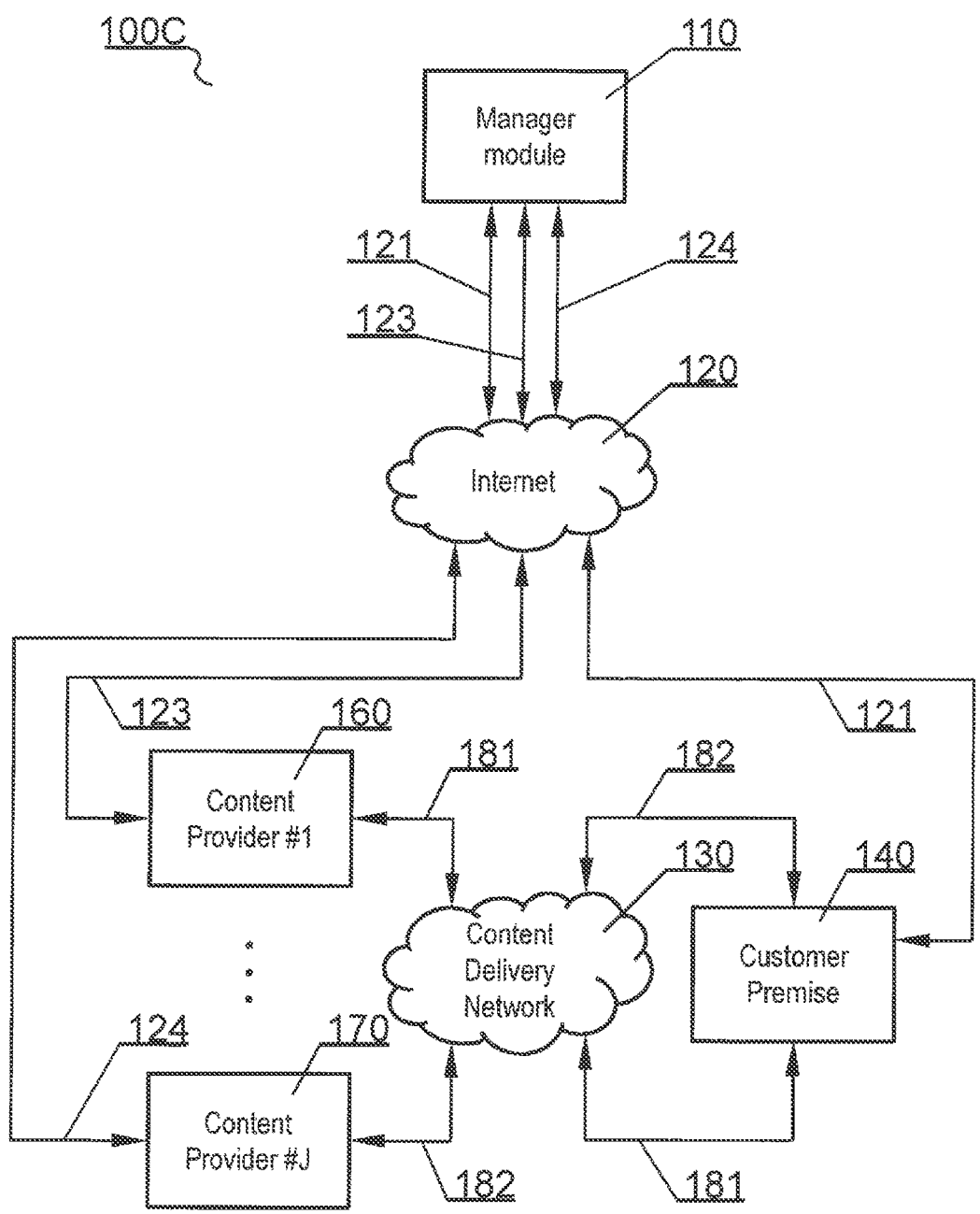

The system 100C shown in FIG. 1C is similar to that shown in FIG. 1A, with the difference in that the content is delivered to a single customer premise 140 from a plurality of content providers 160, 170.

Figure 1D:
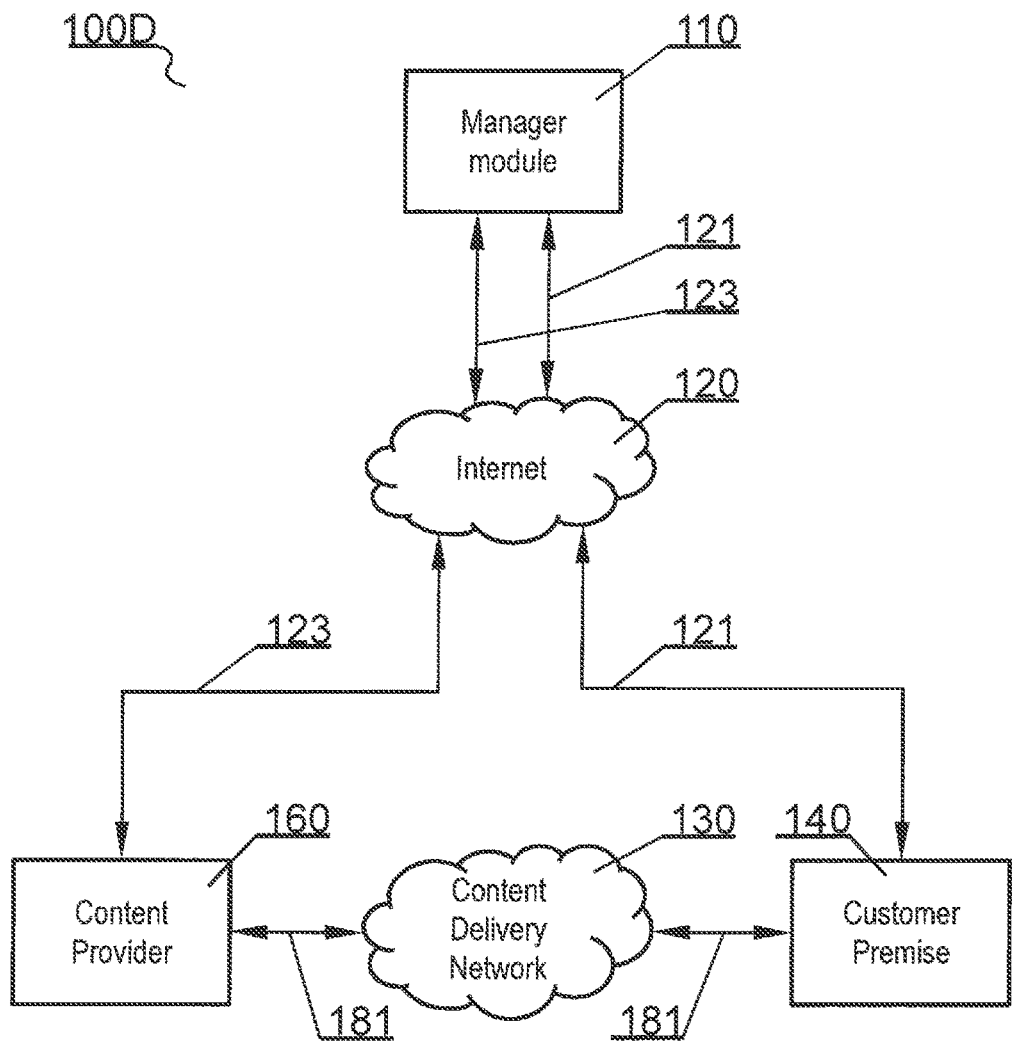

The system 100D shown in FIG. 1D is similar to that shown in FIG. 1A, with the difference in that the content is delivered to a single customer premise 140 from a single content provider 160. To simplify the description of the system and method, the system 100D will be used as a reference system for explanation of further figures, but a skilled person will realize that the concepts presented below can be implemented in systems 100A 100B and 100C in a similar manner.

Figure 1E:
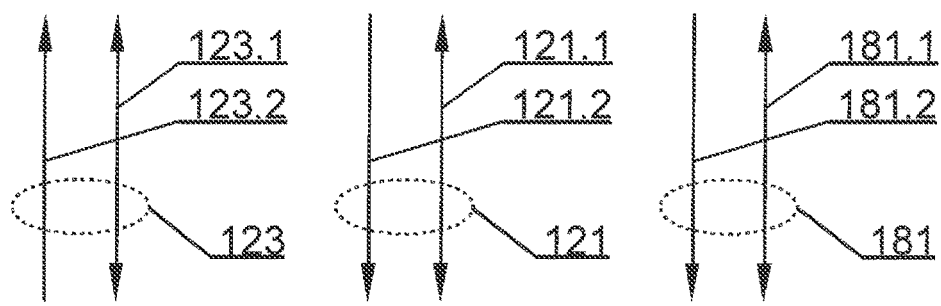
FIG. 1E shows logical channels in communication channels.

FIG. 1E shows logical channels in the communication channels 121, 123, 181. For example, the communication channel 121 may comprise the following logical channels: a bidirectional channel 121.1 for transmission of monitoring and management data and a downstream channel 121.2 for transmission of metadata from the manager module 110 to the customer premise.

The communication channel 123 may comprise a bidirectional channel 123.1 for transmission of monitoring and management data and an upstream channel 123.2 for transmission of metadata from the content provider to the manager module 110.

The communication channel 181 may comprise a bidirectional channel 181.1 for transmission of monitoring and management data and a downstream channel 181.2 for transmission of video data from the content provider to the customer premise.

Figure 2:
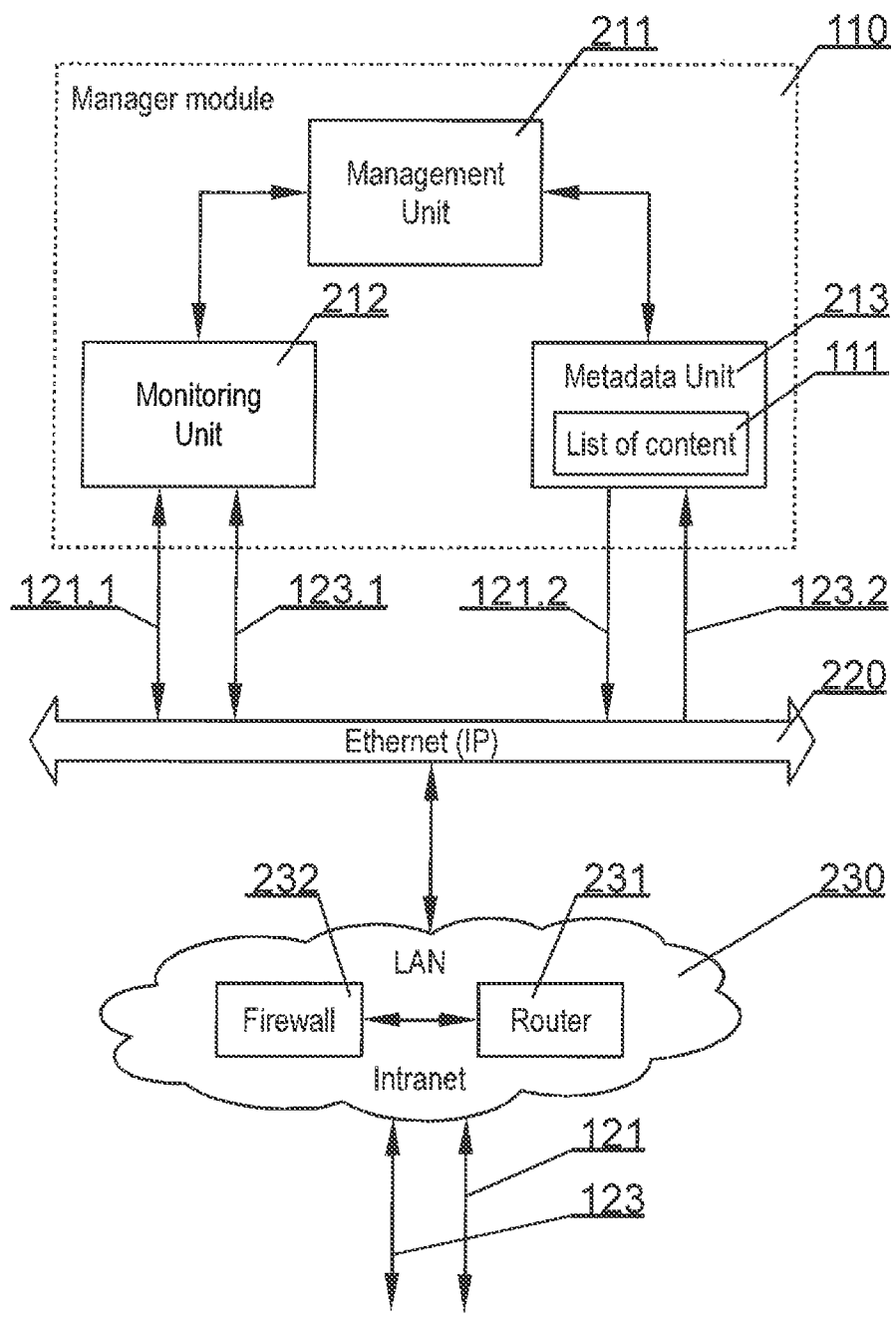
FIG. 2 shows a functional schematic diagram of a manager module.

FIG. 2 shows a functional schematic diagram of the manager module 110. A monitoring unit 212 is configured to receive and transmit monitoring and management data over logical channels 121.1 and 123.1. A metadata unit 213 is configured to receive and transmit metadata over logical channels 121.2 and 123.2. A management unit 211 is configured to communicate with the monitoring unit 212 and the metadata unit 213, process the received data and generate data to be transmitted.

The manager module 110 is connected to an Ethernet (IP) network 220, via which it is connected to an Intranet 230, wherein a firewall 232 and a router 231 operate to secure and coordinate data transmission.

Figure 3:
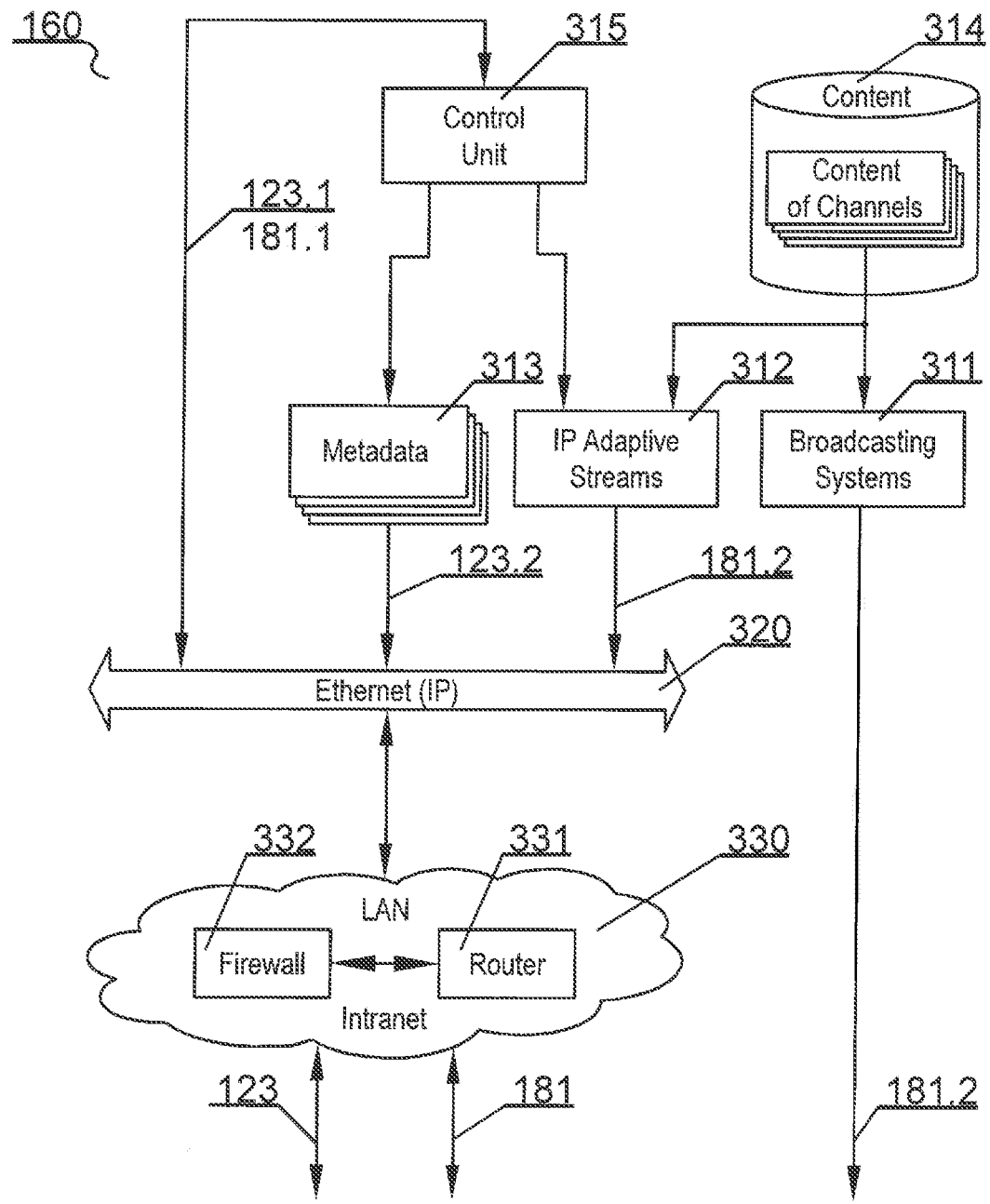
FIG. 3 shows a functional schematic diagram of a content provider system.

FIG. 3 shows a functional schematic diagram of the content provider 160 system, which operates in a manner known in the art. Therefore, there are not required any modifications, to content provider's systems, in order to implement the system and method presented herein.

The content provider 160 system comprises a control unit 315 configured to deliver to the manager module 110, in response to requests received via communication channel 123.1 the requested metadata related to channels from a metadata database 313, such as a list of content (list of channels 111), additional information (such as electronic program guide (EPG) data), etc. Moreover, the control unit 315 is configured to provide to the devices at the customer premises 140 system, in response to requests received via communication channel 181.1, the requested content and/or video streams (via communication channels 181, 181.2).

The content is provided from a content source 314, such as a local storage or a connection with other content providers, as IP adaptive streams managed by unit 312 or as broadcast streams via broadcasting systems 311. Content delivered by the Ethernet (IP) network 320 is transmitted via the Intranet 330, wherein a firewall 332 and a router 331 operate to secure and coordinate data transmission.

Figure 4A:
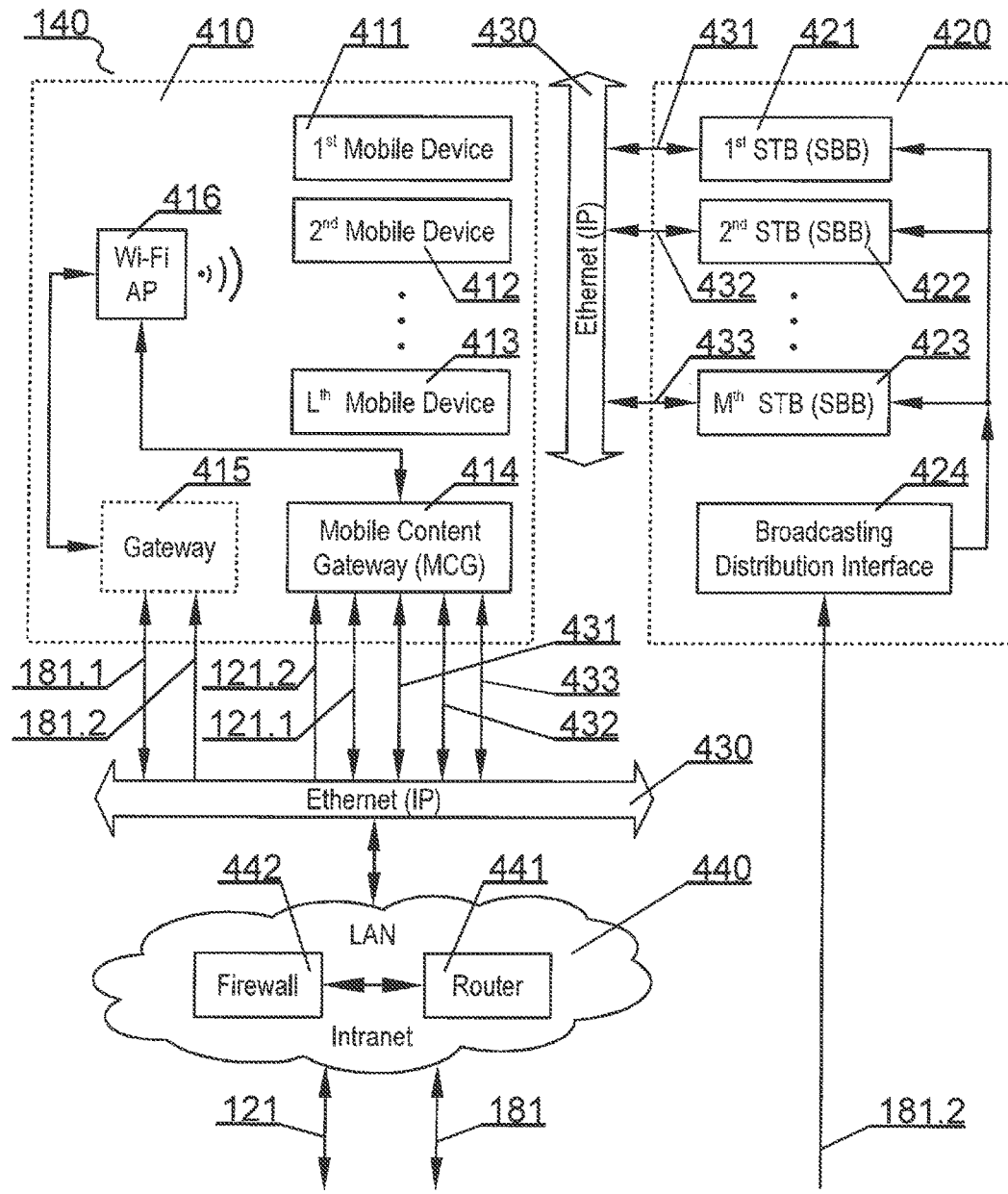
FIG. 4A shows an architecture of a customer premises system.

FIG. 4A shows an architecture of a customer premises 140 system, comprising a set 410 of mobile devices 411-413 (such as users' own tablets, laptops or smartphones configured to communicate wirelessly) and a set 420 of stationary devices 421-423 (such as devices of the premises operator, such as television set-top boxes or set-back boxes configured to communicate via a terrestrial or cable television network).

The stationary devices 420 in the present system serve not only to deliver content to the user (as they typically do, for example to prepare content for display on the television screen to which they are directly connected), but also to generate content to be converted to single-program streams (such as SPTS (Single Program Transport Stream) of MPEG-type system (MPEG-Moving Picture Experts Group)) in the mobile content gateway (MCG) unit 414.

The mobile content gateway 414 unit therefore uses the local resources in form of stationary devices 420 and prepares adaptive streams to be transmitted to the mobile devices 410 via a wireless transmission unit 416, such as a Wi-Fi access point. Communication is effected via the Ethernet (IP) network 430, via which the devices may connect with content provider systems via Intranet 440, wherein a firewall 442 and a router 441 operate to secure and coordinate data transmission.

An alternative embodiment is possible, without the mobile content gateway 414, wherein the transmission of video streams to mobile devices 411-413 from the content provider 160 is effected via a gateway unit 415.

Figure 4B:
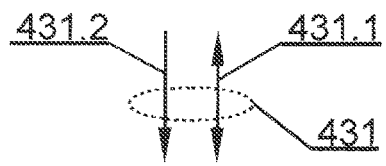
FIG. 4B shows logical channels in physical data interfaces used in a customer premises system.

FIG. 4B shows logical channels in the physical data interfaces 431, 432, 433 used in the customer premises 140 system, such as a bidirectional logical channel 431.1 (similarly, 432.1, 433.1) for transmission of monitoring and management gateway data and 431.2 (similarly, 432.2, 433.2), and an downstream channel 431.2 for transmission of video content (for example in form of SPTS streams).

Figure 5A:
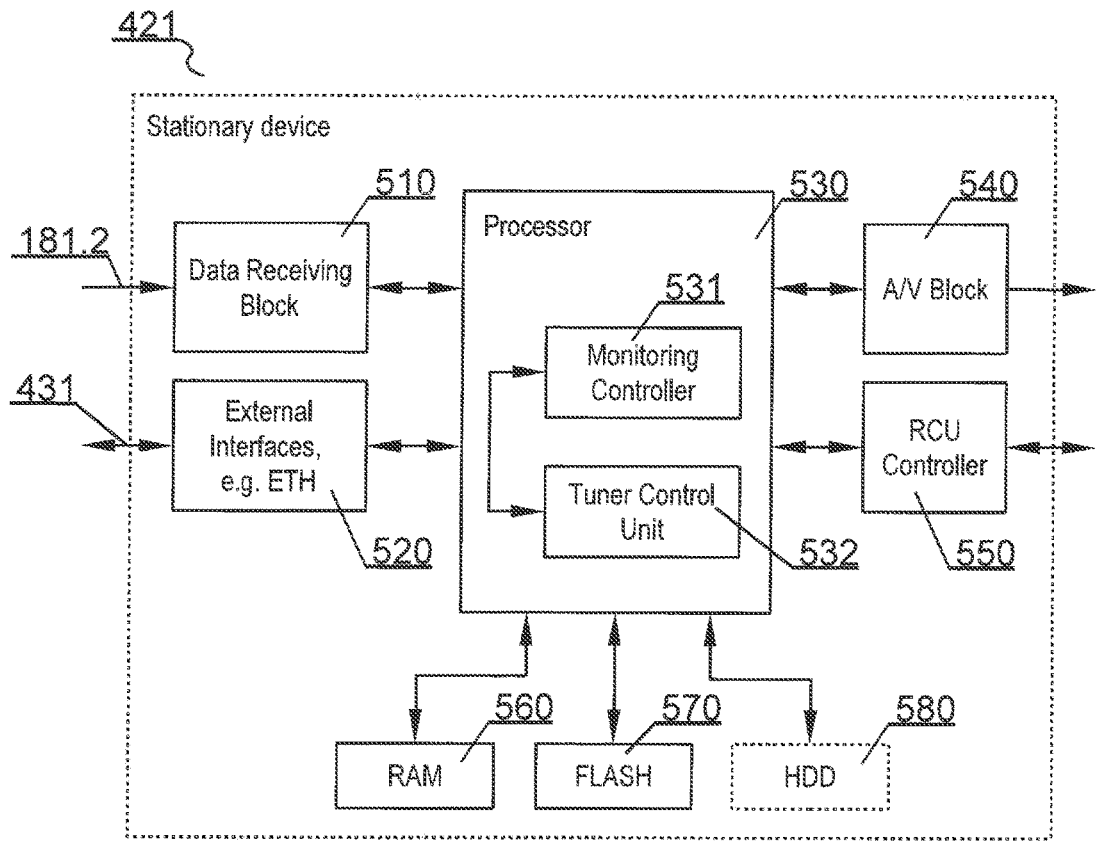
FIG. 5A shows a simplified architecture of a stationary device.

FIG. 5A shows a simplified architecture of a stationary device, such as a television set-top box (STB) or a television set-back box (SBB), wherein mainly the elements essential for operation of the system of the invention are shown.

A data receiving block 510 is configured to receive downstream data, such as video content, from the broadcasting distribution interface 424 via channel 181.2, External interfaces 520, such as the Ethernet interface, are used to communicate via channel 431.

A processor 530 comprises a tuner control unit 532 configured to control tuners 511-513 (discussed in details with reference to FIG. 5B) and a monitoring controller 531 configured to monitor the other device blocks, such as an audio/video block 540 or the external interfaces 520. The device is operable by the user via a remote control unit (RCU) controller 550.

The processor operates utilizing RAM 560 and Flash 570 memory blocks, A hard disk drive 580 or another type of mass storage can be used to store video or other data locally at the device, but is not essential for its operation.

Figure 5B:
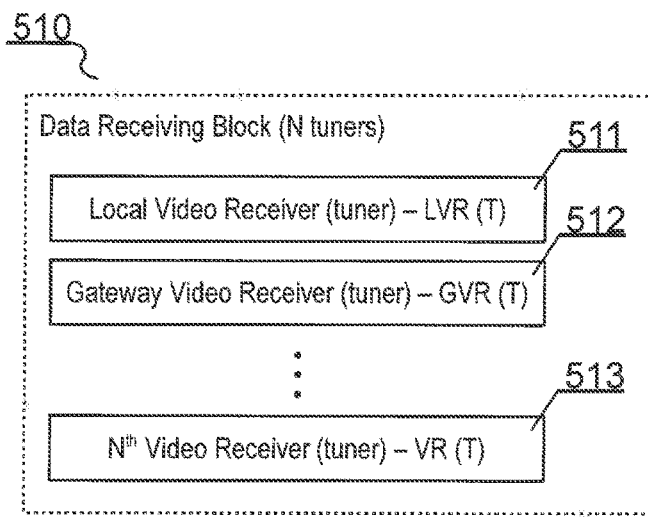
FIG. 5B shows a simplified functional structure of a data receiving block.

FIG. 5B shows a simplified functional structure of the data receiving block 510 (also called a front-end block). It comprises a plurality (N) of tuners (such as satellite, cable, terrestrial or PTV tuners), wherein one of the tuners 511 is a local video receiver (LVR) used for the local purposes of the device (for example to receive content to be displayed at the television screen to which the device is directly connected) and another tuner 512 is a gateway video receiver (GVR) used for the purposes of the mobile content gateway 414 (for example to receive content to be displayed at a mobile device).

The data receiving block may further comprise other (N−2) tuners which may be configured to operate as LVR or GVR units. Television set-top boxes are often equipped with 4 or 8 tuners (such as cable, terrestrial or satellite tuners), therefore a typical set-top box can be easily configured to operate in the system by assigning at least one of the tuners to operate as a GVR unit. The tuners are controlled by the tuner control unit 532 based on information received from the MCG manager 610 of the MCG unit 414.

Figure 6:
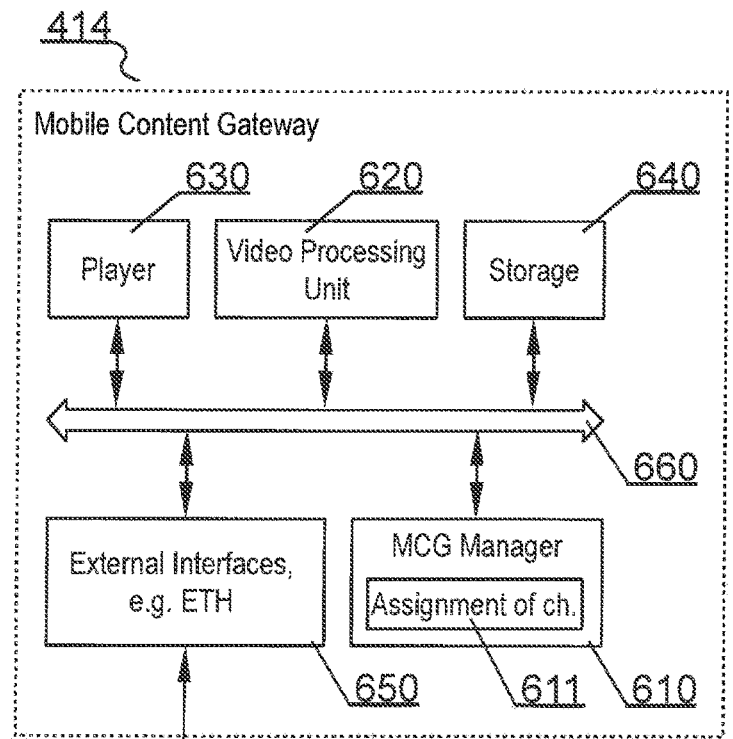
FIG. 6 shows a functional schematic diagram of a mobile content gateway unit.

FIG. 6 shows a functional schematic diagram of the mobile content gateway (MCG) unit 414. It comprises a mobile content gateway (MCG) manager 610 configured to control the system at the client side and the other blocks of the MCG unit 414. A video processing unit (VPU) 620 is configured to prepare single-program streams (such as MPEG-type SPTSs) having particular technical parameters (such as a particular bitrate, resolution, index file (manifest) or a play list, depending on transmission method (such as HLS, Dash or MS Smooth Streaming)) to be transmitted to the mobile devices.

A player unit 630 is configured to transmit the streams prepared by the VPU 620 to particular mobile devices 411-413 in response to a request from the MCG manager 610. A mass storage 640 is used to store the video streams transmitted from the devices 421-423 to the MCG 414, single-program streams to be transmitted to the mobile devices 411-413 and as a cache memory for storing temporary results of operations realized by the other units of the MCG unit 414. External interfaces 650 are used for communicating with other elements of the customer premise 140 system. All blocks may communicate via an internal communication bus 660.

Figure 7:
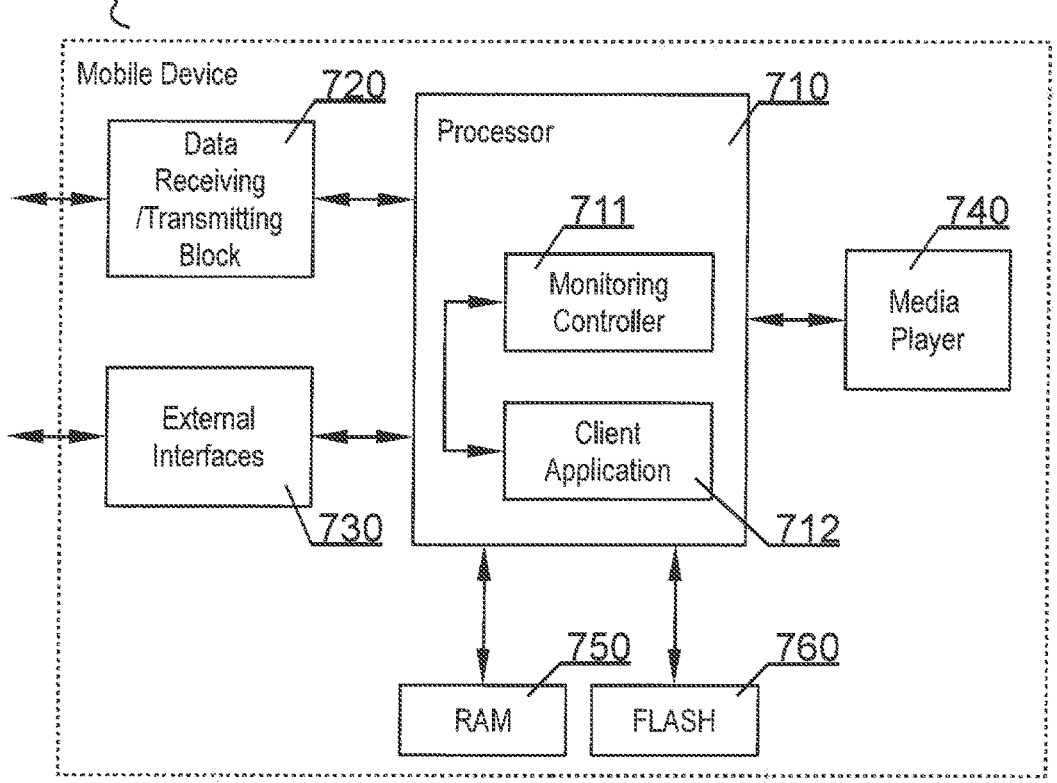
FIG. 7 shows a simplified architecture of a mobile device.

FIG. 7 shows a simplified architecture of a mobile device 411 (such as a user's tablet, laptop or smartphone) wherein mainly the elements essential for operation of the system of the invention are shown. A data receiving/transmitting block 720 is configured to receive the video data (for example in form of a single-program stream) dedicated for the particular mobile device 411 via a wireless transmission channel from the wireless transmission device 416.

Figure 10A:
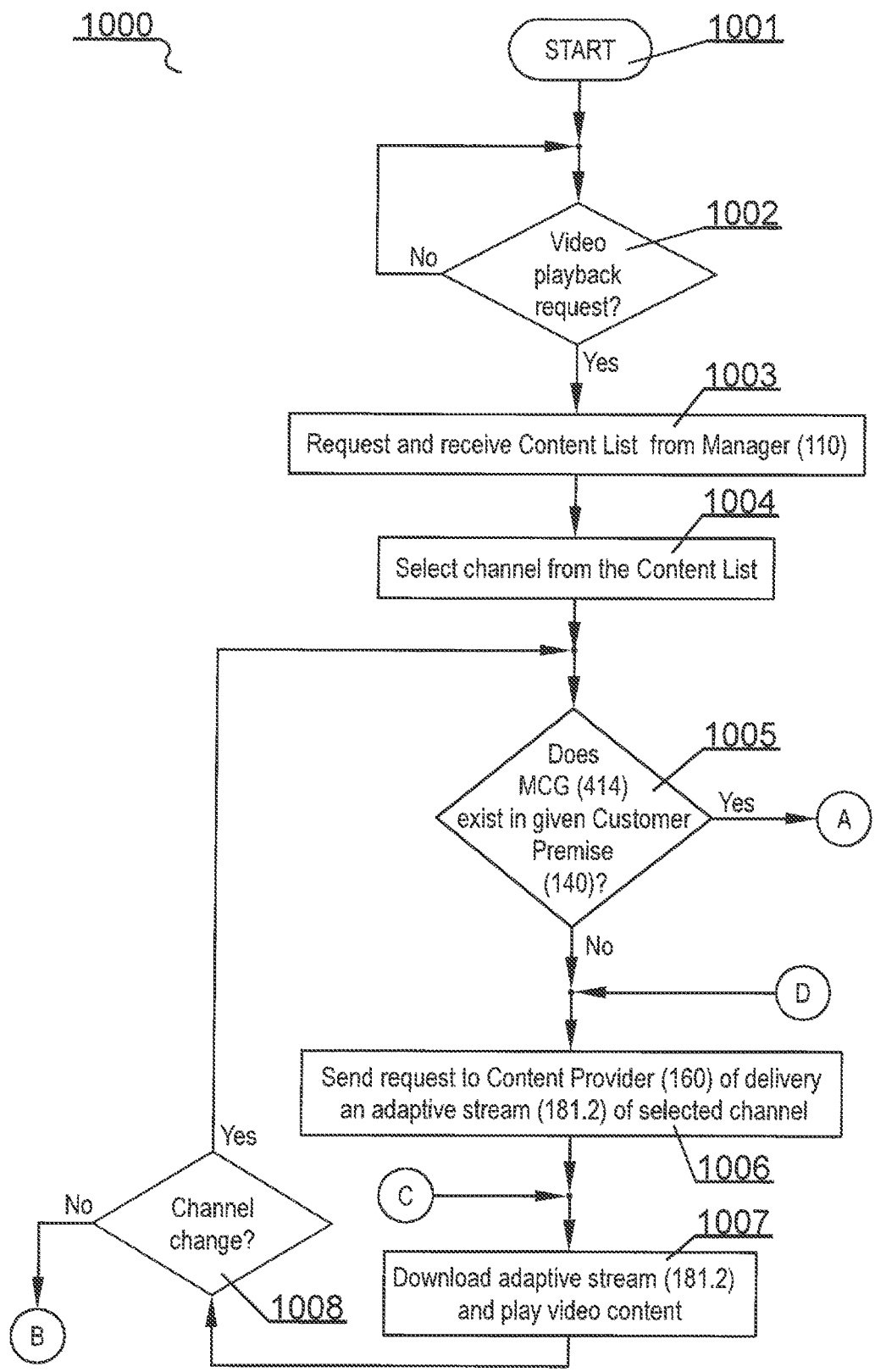
FIGS. 10A and 10B show a schematic diagram of operation of the client application operable at the mobile device.
Figure 10B:
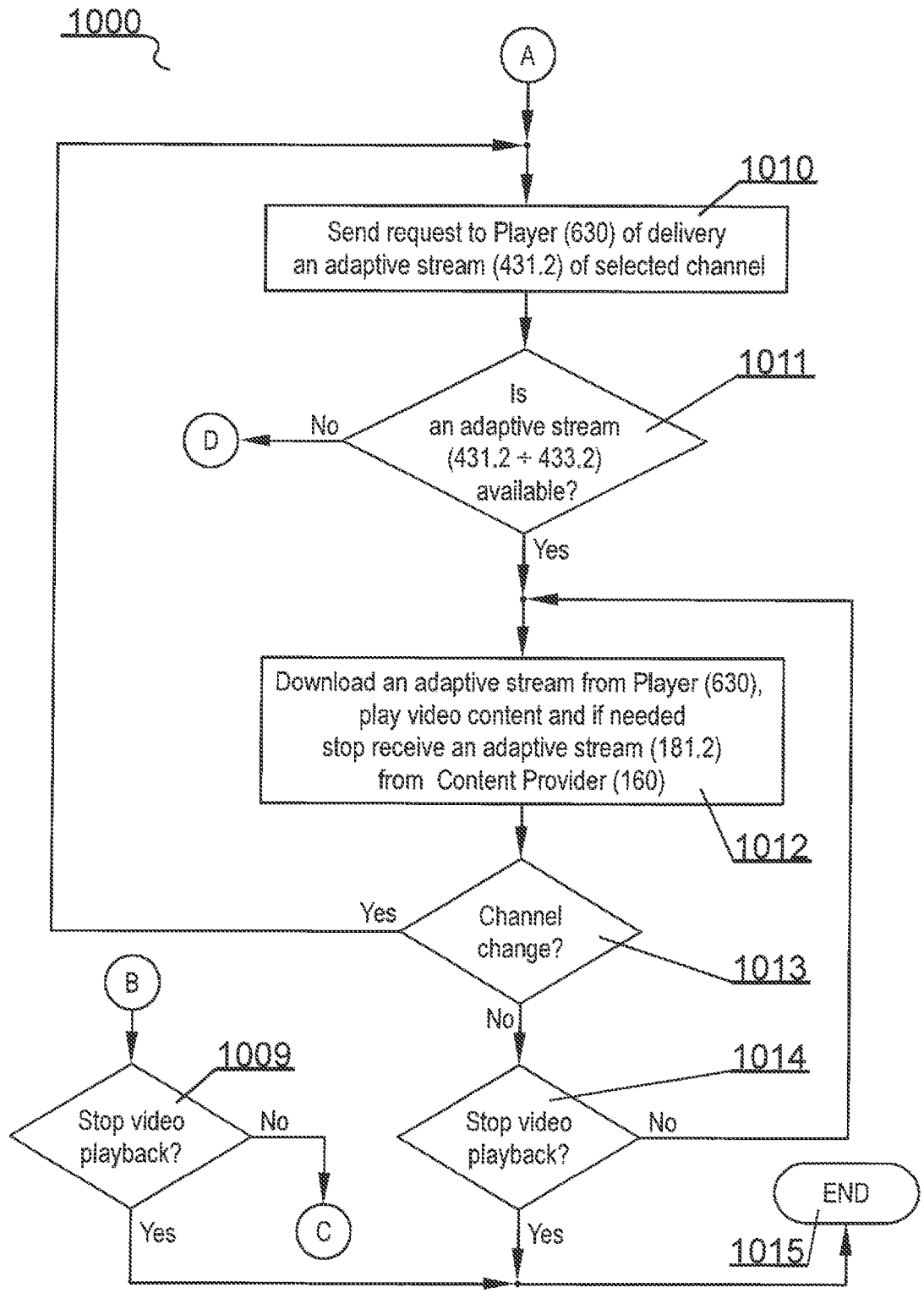

External interfaces 730, such as the Ethernet interface, are used to communicate via other communication channels. A processor 710 operates a client application 712 and a monitoring controller configured to monitor the other mobile device blocks, such as a media player 740 or the external interfaces 730. The processor operates utilizing RAM 750 and Flash 760 memory blocks. The client application 712 allows the device to receive video content from the stationary devices 421-423 of the customer premise 140 system, and its detailed structure is shown in FIGS. 10A and 10B.

Figure 8:
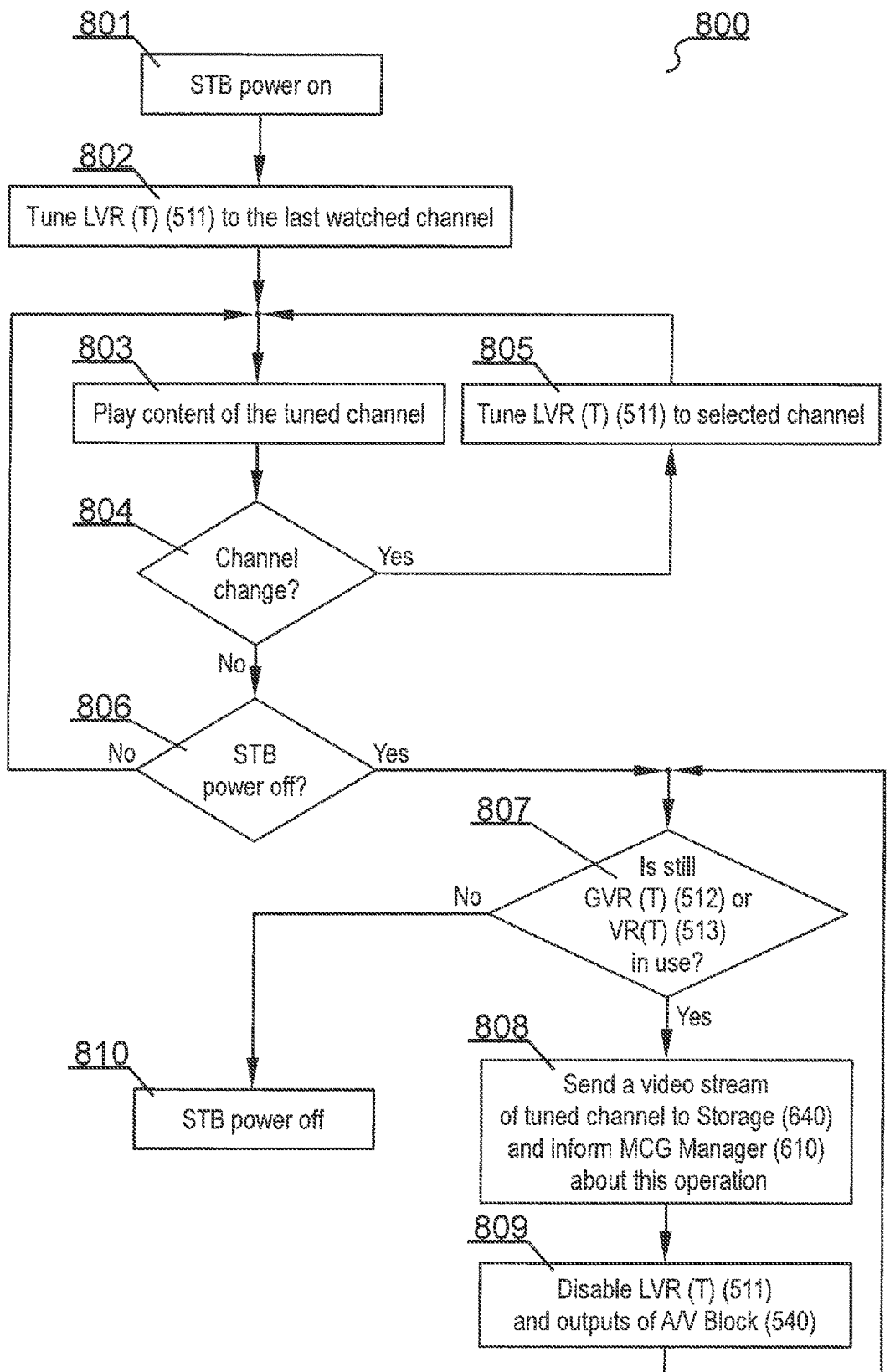
FIG. 8 shows a schematic diagram of one of processes operable at the stationary device, indicating the operation of the device when content is watched at a selected channel.

FIG. 8 shows a schematic diagram of one of processes operable at the stationary device 421, indicating the operation of the device 421 when content is watched at a selected channel (in a manner typical to standard STB or SBB operation), its change and operations necessary to be performed while switching off (the operations particularly specific for the present invention include steps 807-809).

When the device 421 is switched on in step 801, the LVR unit 511 is tuned to the last watched channel in step 802. Next, the content of the tuned channel is played in step 803 until a channel change command is received in step 804 or a power-off command is received in step 806, in case of receiving a channel change request, the LVR unit 511 is tuned to the selected channel in step 805.

In case of receiving a power off command, it is checked in step 807 whether the GVR unit 512 or another VR unit 513 is in use. If not, the device is turned off in step 810. However, if a gateway tuner 512, 513 is in use, the video stream of the tuned channel is sent to the storage 640 and the MCG manager 610 is informed about the intention to power off the currently operating stationary device 421.

Subsequently, the LVR unit 511 and the outputs of the audio/video block 540 are disabled in step 808, such that from the user's perspective the device seems to be turned off, while the GVR unit 512 is still operating.

Figure 9:
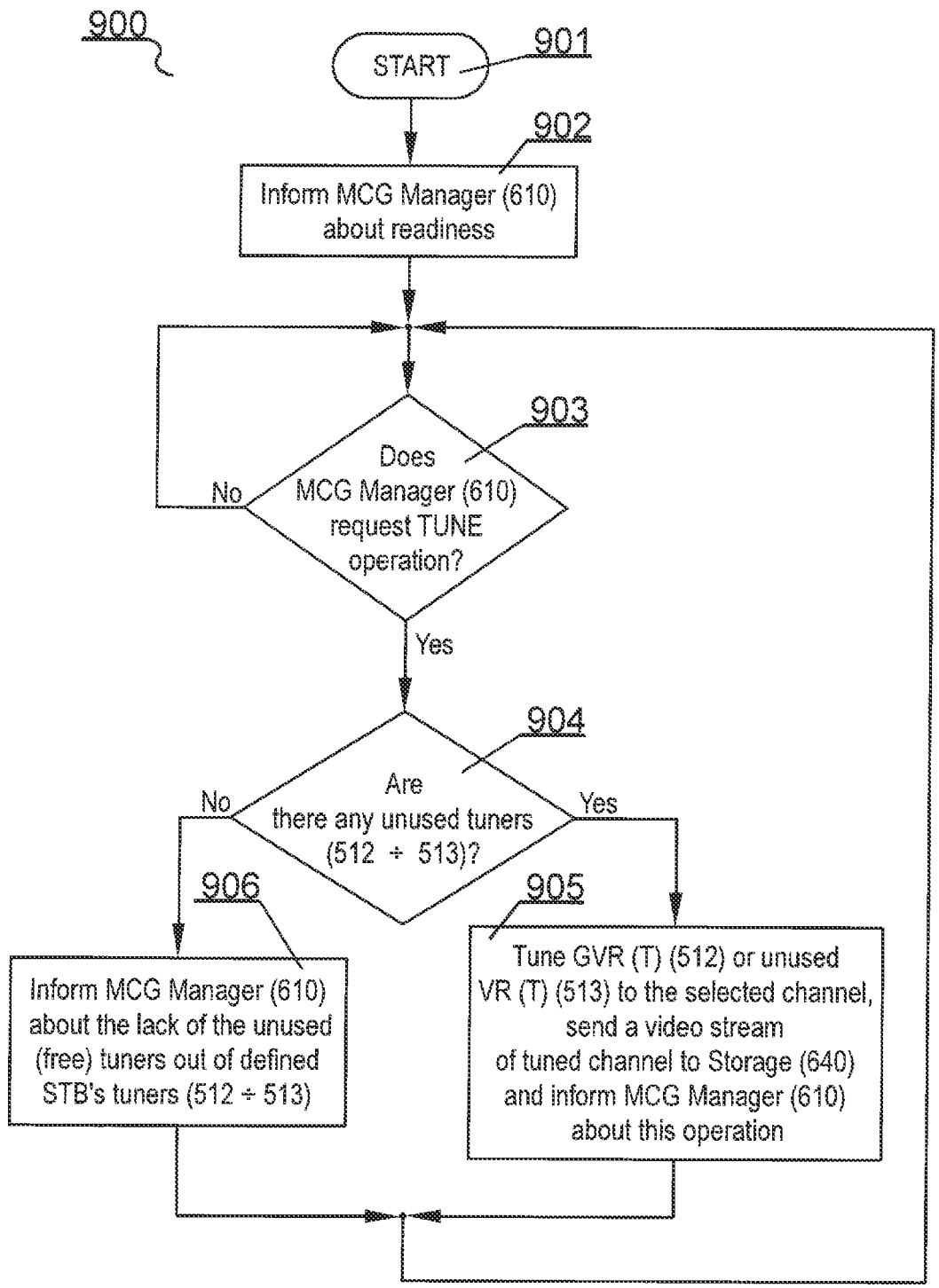
FIG. 9 shows a schematic diagram of one of processes operable at the stationary device, indicating the operations of the device when it receives a request from the mobile content gateway manager to perform the operations of tuning to a selected channel.

FIG. 9 shows a schematic diagram of one of the processes operable at the stationary device 421, indicating the operations of the device 421 when it receives a request from the MCG manager 610 to perform the operations of tuning to a selected channel and sending a video stream to prepare an appropriate stream by the VPU 620 and send the prepared stream to a specific mobile device via the player unit 630, which plays a role in operation of the system of the present invention.

Upon initiation in step 901, the device 421 informs the MCG manager 610 about its readiness to operate in step 902 and awaits in step 903 to receive a request from the MCG manager 610 to perform a TUNE operation, i.e. to tune to a specific channel to be transmitted to a mobile device.

Upon receipt of the request, the device 421 checks in step 904 whether any of its tuners 512, 513 are available. If not, then the MCG manager 610 is informed about lack of unused (free) tuners and the device continues to operate until the next TUNE request is received in step 903. However, in case one of the tuners 512, 513 is free, then in step 905 that free tuner 512,513 is tuned to the selected channel, and the video stream of the tuned channel is sent to storage 640, while the MCG manager 610 is informed about this operation. The device continues its operation until receipt of a next TUNE request in step 903.

FIGS. 10A and 10B show a schematic diagram of operation of the client application 712 operable at the mobile device 411-413, which indicates the method of reception of single-program video streams (steps 1010-1014) in a case when the MCG unit 414 functions in the customer premises 140 system (step 1005) or in a case when the content is received directly from the content provider 160 (steps 1006-1009).

After initiation in step 1001, the application awaits a video playback request in step 1002. When the user requests video playback, the application requests and receives a channels list 611 from the manager module 110 in step 1003 and then presents the channels list 611 to user and allows selection of particular channel from the list in step 1004.

Subsequently, at step 1005 it is checked whether an MCG unit 414 is present in a given customer premise 140. If not, then a request is sent in step 1006 directly to the content provider 160 to deliver, via the communication channel 181.2, an adaptive stream of the selected channel. Next, the adaptive stream is downloaded in step 1007 and played at the user's mobile device in step 1007 until a channel change request is received in step 1008 or a video playback stop command is received in step 1009. In turn, when the particular customer premise 140 system has an MCG is unit 414, then in step 1010 a request is sent to the player 630 to deliver an adaptive stream 431.2 of the selected channel.

In step 1011 it is checked if the adaptive stream is available over the communication channels 431.2-433.2 (i.e. whether there is any stationary device in the system providing that content)—if not, then a request for that content is sent to the content provider 160 directly in step 1006.

If the adaptive stream is available at the customer premises 140 system, then in step 1012 the adaptive stream is downloaded from the player 630 and the content is played to the user. In case the content was retrieved earlier from the content provider directly, this transmission is terminated in step 1012. The playback is continued until a channel change request is received in step 1013 or a video playback stop request is received in step 1014. Then the procedure ends in step 1015.

Figure 11A:
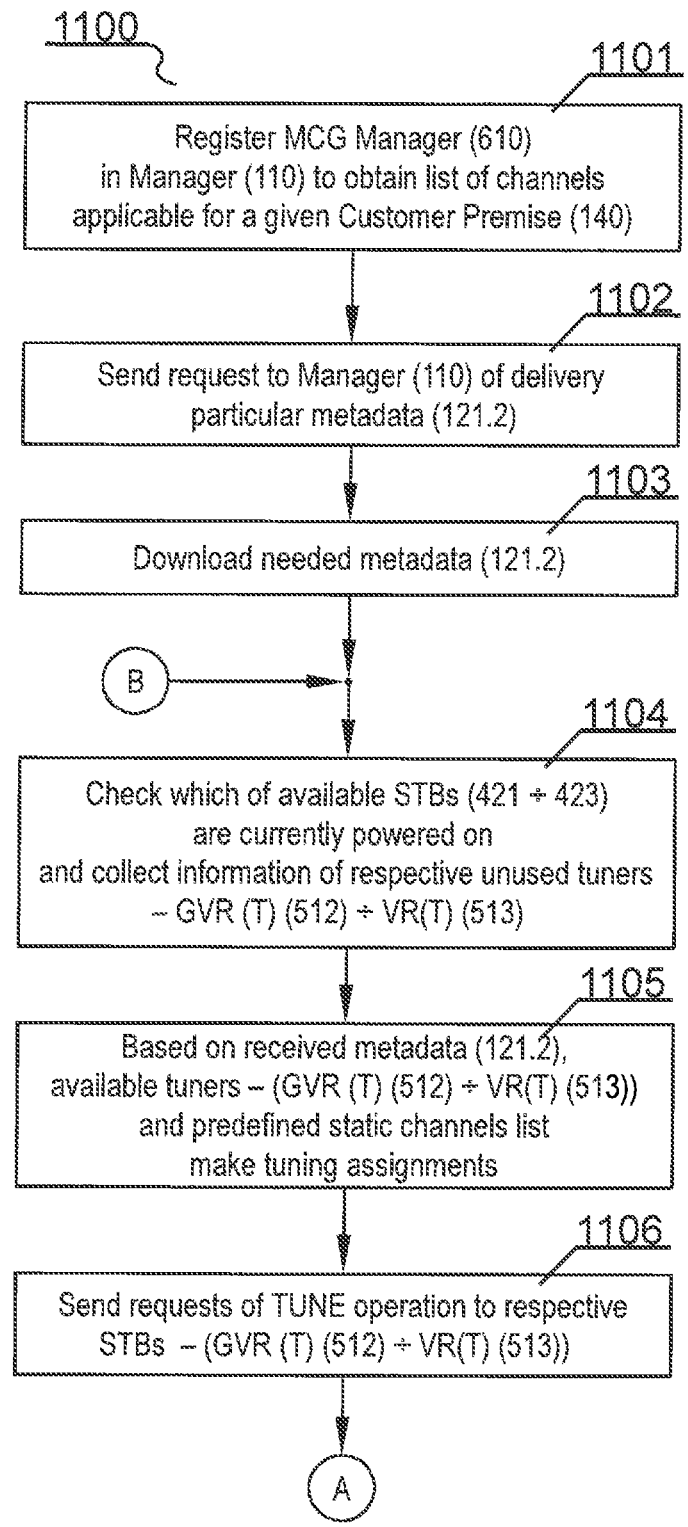
FIGS. 11A-11B show a schematic diagram of a process operated by the mobile content gateway unit to provide static addressing of channels in devices.
Figure 11B:
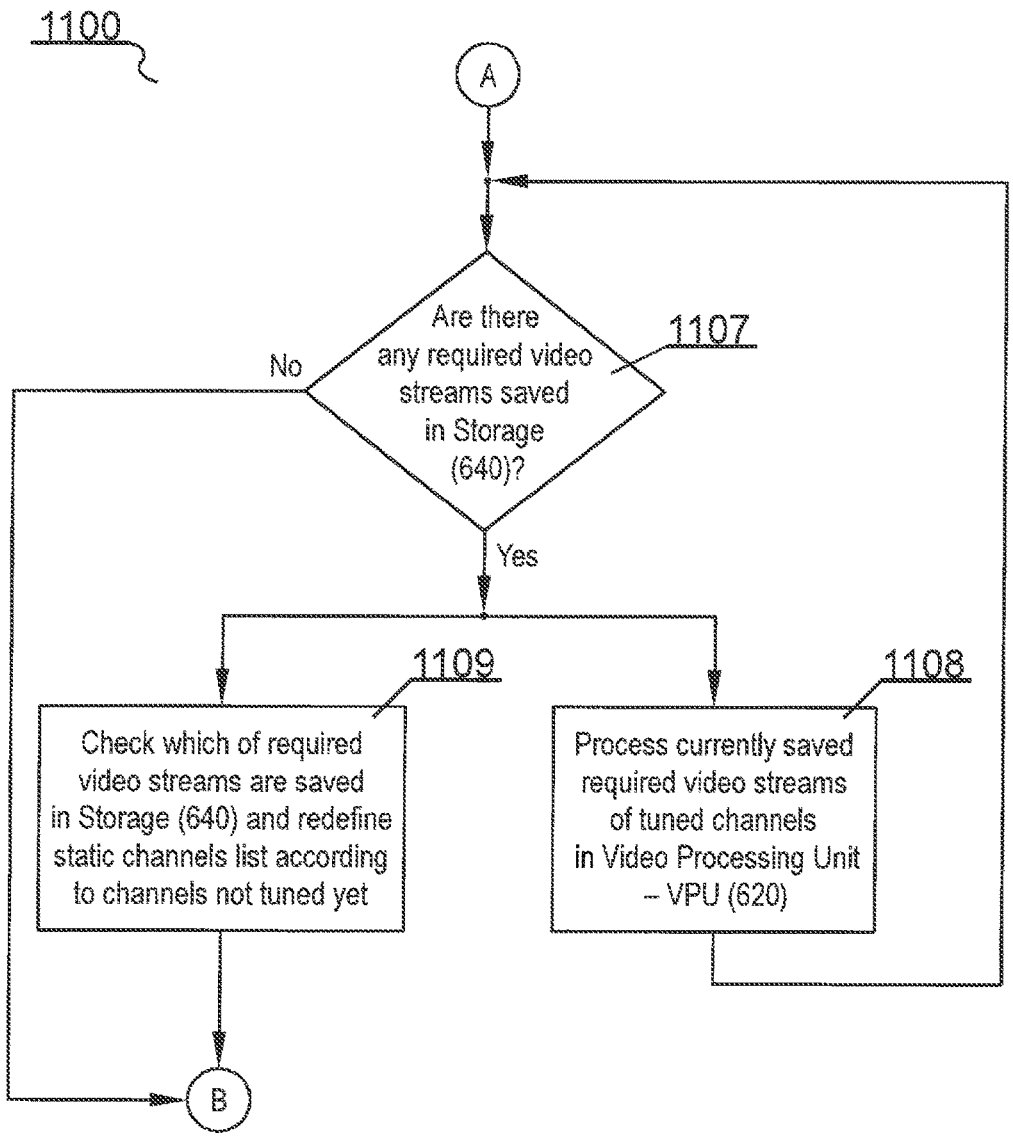

FIGS. 11A-11B show a schematic diagram of a process operated by the MCG manager 610 in order to provide static addressing of channels in the stationary devices 421-423 of the customer premises 140 system and to transmit video content at the mobile devices 411-413 from the local resources 420, in order to limit the traffic on the network and to increase the throughput capabilities of the content delivery network 130.

In the present invention, the channels are statically assigned to the devices 421-423 according to a list of channels 611 (for example, the first device 421 is associated with the first channel A, the second device 422 is associated with the second channel B, etc). The list 611 is created based on the number of devices 421 in the customer premises 140 system.

For example, if 100 devices 421 with free tuners are available, then 100 static channels can be assigned to be transmitted locally to mobile devices within the customer premises 140 system. First, the tuners of the devices 421 are tuned statically to their corresponding (assigned) channels, and next the other channels, which are required by the mobile devices are requested, depending on the availability of free tuners 512, 513 at the stationary devices 421, assuming that each stationary device has at least two tuners.

In step 1101 the MCG manager 610 is registered in the manager module 110 to obtain a list 611 of channels applicable for a given customer premise 140 system. Next, a request is sent to the manager module 110 to deliver particular metadata over communication channel 121.2, which is then downloaded in step 1103. In step 1104 it is checked which of the available devices 421-423 are currently powered on and information about their free (unused) tuners 512, 513 is collected.

In step 1105, based on the received metadata and available tuners and predefined static channels list 611, tuning assignments are made. The requests to tune to a particular channel are sent to respective devices 421-423 in step 1106. In step 1107 it is checked whether any of the required video streams are already stored in the storage 640 and if so, they are processed in the video processing unit 620 in step 1108.

Figure 12:
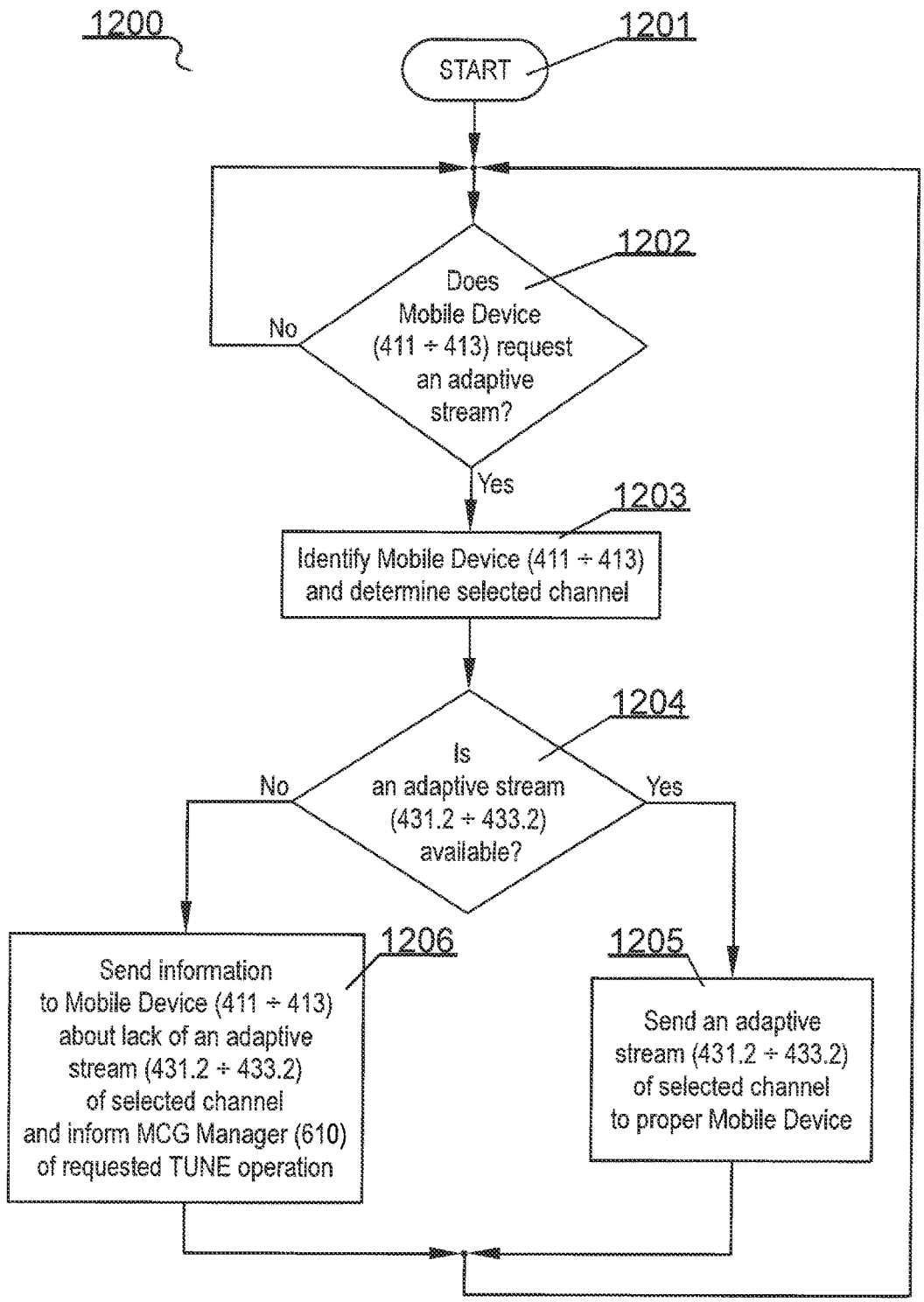
FIG. 12 shows a schematic diagram of the process executed by the player unit.

FIG. 12 shows a schematic diagram of the process executed by the player unit 630. After initiation in step 1201, the player unit 630 checks in step 1202 whether a mobile device 411-413 requests an adaptive stream and if so, in step 1203 it identifies the particular requesting mobile device 411-413 and determines the requested channel. In step 1204 the player checks whether an adaptive stream for that channel is available on communication channels 431.2-433.2. If not, information is sent to the mobile device 411-413 that the adaptive stream for the requested channel is unavailable and the MCG manager 610 is informed of the requested TUNE operation.

If an adaptive stream is available on the communication channels 431.2-433.2, the stream is sent to the requesting mobile device 411-413.

The implementation of the invention is effected by the particular computer systems and computer-executed methods. Thus the machine or transformation test is therefore fulfilled and the idea is not abstract.

It can be easily recognized, by one skilled in the art, that the aforementioned method for distributing content may be performed and/or controlled by one or more computer programs, Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for distributing video content to at least one mobile device at a customer premises system comprising a plurality of stationary devices capable of receiving the video content from at least one content provider, the method comprising the steps of:
   receiving, at the stationary devices, requests to tune a tuner of the stationary device to a requested channel received from the content provider;

outputting the content, of the channel tuned to by at least one stationary device, to a mobile content gateway at the customer premises system;

handling, at the mobile content gateway, a list of video channels comprising data associating each channel of the list with a stationary device;

sending, from the mobile content gateway, to the at least one stationary device requests to tune to channels assigned according to the list of video channels;

preparing at least one single-program stream from the content received from the at least one stationary device;

outputting, from the mobile content gateway, the at least one single-program stream as at least one adaptive stream;

providing the at least one adaptive stream to the at least one mobile device over a wireless data transmission interface; and after receiving at the stationary device a power-off command while a tuner tuned to a channel requested by the mobile content gateway is still active, disabling a local tuner and outputs of an A/V block of the stationary device while continuing to operate the tuner tuned to a channel requested by the mobile content gateway.

2. The method according to claim 1, further comprising sending, from the mobile content gateway, to the at least one stationary device a request to tune to a channel requested by the at least one mobile device and not being comprised in the list of video channels.

3. The method according to claim 1, further comprising: at the mobile device, receiving a content list from a manager module and allowing the user to select a channel from the content list.

4. The method according to claim 3, further comprising checking, at the mobile device, checking whether an adaptive stream for the selected channel is available from the mobile content gateway and if not, sending a request for an adaptive for the selected channel to the content provider.

5. A non-transitory computer readable medium storing computer-executable instructions performing all the steps of the method according to claim 1 when executed on a computer.

6. A system for distributing video channels to at least one mobile device at a customer premises system comprising a plurality of stationary devices capable of receiving the video channels from at least one content provider, the system comprising:

a plurality of tuner control units at the stationary devices, configured to receive requests to tune a tuner of the stationary device to a requested channel received from the content provider and to output the content of the channel tuned to by at least one stationary device to a mobile content gateway at the customer premises system, and further configured to disable a local tuner and outputs of an A/V block of the stationary device while continuing to operate the tuner tuned to a channel requested by the mobile content gateway after receiving a power-off command while the tuner tuned to a channel requested by the mobile content gateway is still active;

wherein the mobile content gateway comprises:
a mobile content gateway manager configured to manage a list of video channels comprising data associating each channel of the list with a stationary device and to send to the tuner control unit of the at least one stationary device requests to tune to channels assigned according to the list;

a video processing unit configured to prepare at least one single-program stream from the content received from the at least one stationary device; and a player unit configured to output the at least one single-program stream as at least one adaptive stream;

and wherein the system further comprises a wireless access point configured to provide the at least one adaptive stream to the at least one mobile device over a wireless data transmission interface.

7. The system according to claim 6, wherein the mobile content gateway further comprises a storage configured to store the video streams received from the stationary devices and the single-program streams to be transmitted to the at least one mobile device.

* * * * *